United States Patent
Choquette et al.

(10) Patent No.: US 8,949,841 B2
(45) Date of Patent: Feb. 3, 2015

(54) APPROACH FOR A CONFIGURABLE PHASE-BASED PRIORITY SCHEDULER

(71) Applicant: NVIDIA Corporation, Santa Clara, CA (US)

(72) Inventors: Jack Hilaire Choquette, Palo Alto, CA (US); Olivier Giroux, San Jose, CA (US); Robert J. Stoll, Los Altos, CA (US); Gary M. Tarolli, Concord, MA (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 215 days.

(21) Appl. No.: 13/728,828

(22) Filed: Dec. 27, 2012

(65) Prior Publication Data

US 2014/0189698 A1 Jul. 3, 2014

(51) Int. Cl.
*G06F 9/46* (2006.01)
*G06F 9/48* (2006.01)

(52) U.S. Cl.
CPC .................................. *G06F 9/4881* (2013.01)
USPC ....................................................... 718/103

(58) Field of Classification Search
CPC ... G06F 9/4881; G06F 9/4843; G06F 9/4887; G06F 3/1262
See application file for complete search history.

(56) References Cited

U.S. PATENT DOCUMENTS

| 5,247,677 | A  | * | 9/1993  | Welland et al. | 718/103 |
| 6,041,354 | A  | * | 3/2000  | Biliris et al. | 709/226 |
| 6,542,921 | B1 | * | 4/2003  | Sager | 718/108 |
| 6,928,647 | B2 | * | 8/2005  | Sager | 718/108 |
| 7,747,426 | B2 | * | 6/2010  | Nakamura et al. | 703/19 |
| 8,028,286 | B2 | * | 9/2011  | Fedorova | 718/102 |
| 8,589,938 | B2 | * | 11/2013 | Craik et al. | 718/104 |
| 8,589,939 | B2 | * | 11/2013 | Craik et al. | 718/104 |
| 8,626,882 | B2 | * | 1/2014  | Jiang | 709/222 |
| 8,683,470 | B2 | * | 3/2014  | Omara et al. | 718/102 |

OTHER PUBLICATIONS

Zhou et al. "Handling Data Skew in Parallel Hash Join Computation Using Two-Phase Scheduling" IEEE 1995, pp. 527-536.*
Pinel et al. "A Two-Phase Heuristic for the Scheduling of Independent Tasks on Computational Grids" IEEE 2011, pp. 471-477.*

* cited by examiner

*Primary Examiner* — Van Nguyen
(74) *Attorney, Agent, or Firm* — Patterson & Sheridan LLP

(57) ABSTRACT

A streaming multiprocessor (SM) in a parallel processing subsystem schedules priority among a plurality of threads. The SM retrieves a priority descriptor associated with a thread group, and determines whether the thread group and a second thread group are both operating in the same phase. If so, then the method determines whether the priority descriptor of the thread group indicates a higher priority than the priority descriptor of the second thread group. If so, the SM skews the thread group relative to the second thread group such that the thread groups operate in different phases, otherwise the SM increases the priority of the thread group. f the thread groups are not operating in the same phase, then the SM increases the priority of the thread group. One advantage of the disclosed techniques is that thread groups execute with increased efficiency, resulting in improved processor performance.

21 Claims, 10 Drawing Sheets

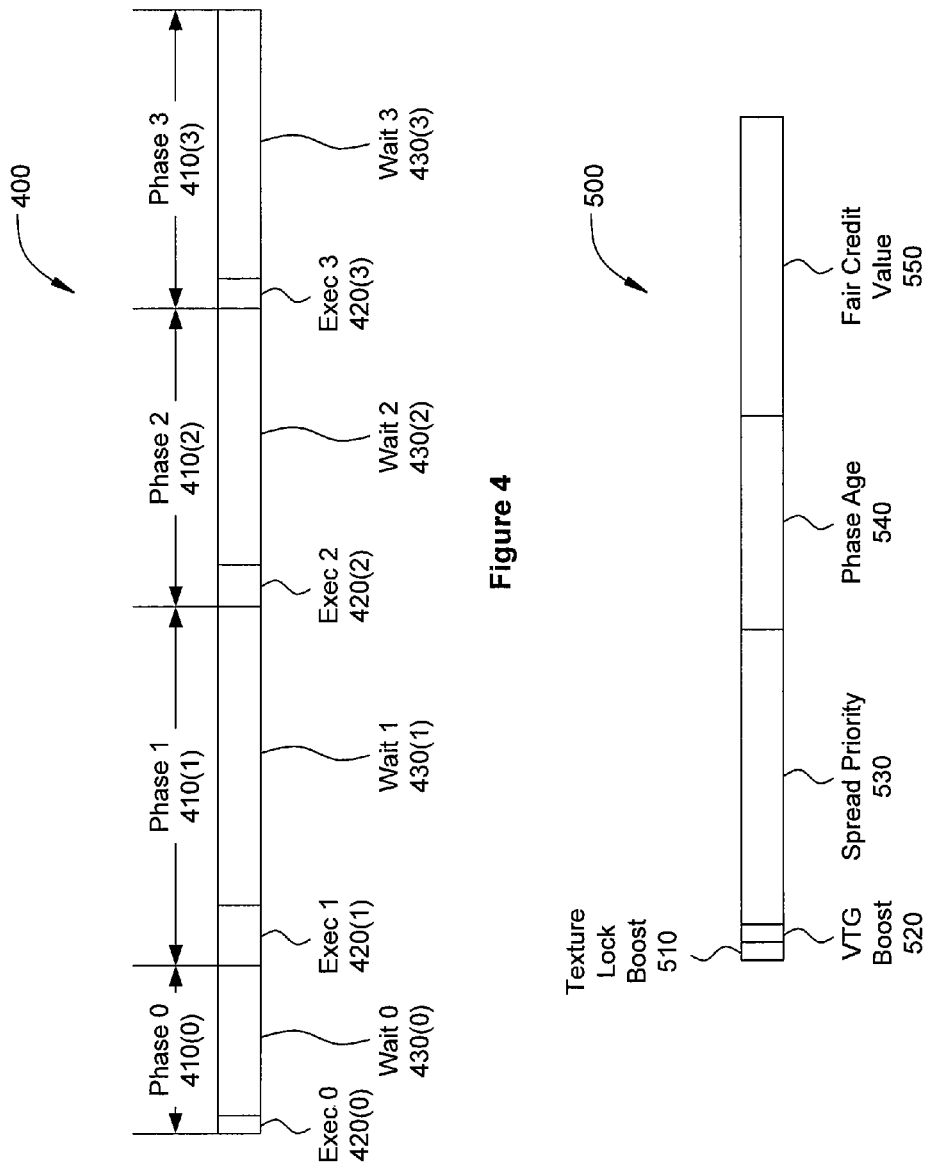

APPROACH FOR A CONFIGURABLE PHASE-BASED PRIORITY SCHEDULER

BACKGROUND OF THE INVENTION

1. Field of the Invention

The present invention generally relates to multi-threaded computer architecture, and, more particularly, to an approach for a configurable phase-based priority scheduler.

2. Description of the Related Art

A common practice in parallel processing systems is to design a processor that executes multiple threads simultaneously. In a typical thread sequence, the processor executes a series of instructions and then performs an operation to load data from memory. The load operation retrieves one or more data items from memory that the processor then processes during the following execution cycle. For example, the load operation could retrieve data from system memory representing a texture map to be applied to a graphics object. In another example, the load operation retrieves data stored in a file on a storage disk subsystem.

Because the time to retrieve the data items is indeterminate, the processor waits for the memory load operation to complete. The processor may execute some instructions during the waiting period, so long as those instructions do not depend on the data retrieved during the load operation. Otherwise, the processor suspends execution of instructions while the load operation is pending. Once the load operation completes, the processor resumes execution of instructions until the next memory load operation is encountered. The processor then suspends execution again, pending completion of the next load operation. During these suspension periods, the processor does not execute instructions, resulting in loss of performance. This sequence of execution cycles interspersed with memory load operations is typical of operations that may be performed by single instruction multi-thread (SIMT) and single instruction multi-data (SIMD) processors.

In such cases, one approach to improving processor performance is to schedule a second thread to execute during the waiting period. As the first thread suspends execution and enters a wait period, the processor executes the second thread while the memory load operation for the first thread is pending. This approach improves performance because the processor executes instructions for the second thread during the waiting period associated with the first thread. However, one drawback to this approach is that the execution cycle for the second thread may differ from the duration of the waiting period for the first thread. If the execution cycle for the second thread is shorter than the duration of the waiting period for the first thread, then the second thread enters a waiting period while the first thread is still in a waiting period. In such cases, the processor suspends execution of instructions for both threads until at least one of the memory load operation completes.

If, on the other hand, the execution cycle for the second thread is longer than the duration of the waiting period for the first thread, then the first thread may preempt execution of instructions by the second thread. In such cases, the first thread resumes execution of instructions until the first thread encounters the next memory load operation. The processor then suspends the first thread again and completes the remaining portion of the execution cycle for the second thread until the second thread encounters the next memory load operation. The processor then suspends the second thread and waits for at least one of the memory load operations to complete. Again, such a toggled approach to suspending and resuming execution across different threads results in performance losses.

As the foregoing illustrates, what is needed is a more effective way to schedule threads for execution.

SUMMARY OF THE INVENTION

One embodiment of the present invention sets forth a method for scheduling priority among a plurality of threads. The method includes receiving a first thread group comprising one or more threads, and retrieving a first priority descriptor associated with the first thread group. The method further includes determining whether the first thread group and a second thread group are both operating in a first phase. If the first thread group and the second thread are both operating in a first phase, then the method further includes determining whether the first priority descriptor represents a higher priority than a second priority descriptor associated with the second thread group. The method further includes skewing the first thread group relative to the second thread group such that the first thread group operates in a second phase, if the first priority descriptor represents a higher priority than the second priority descriptor, or changing the first priority descriptor to a value representing a higher priority, otherwise. If the first thread group and the second thread are not both operating in a first phase, then the method further includes changing the first priority descriptor to a value representing a higher priority.

Other embodiments include, without limitation, a subsystem that includes a streaming multiprocessor configured to implement one or more aspects of the disclosed methods as well as a computing device configured to implement one or more aspects of the disclosed methods.

One advantage of the disclosed techniques is that thread groups execute with increased efficiency, resulting in improved processor performance. Thread groups are scheduled for execution in a manner that reduces the time spent by the processor waiting for completion of memory load operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates a thread group that includes multiple phases, according to one embodiment of the present invention;

FIG. 5 illustrates a segmented priority descriptor associated with a thread group, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
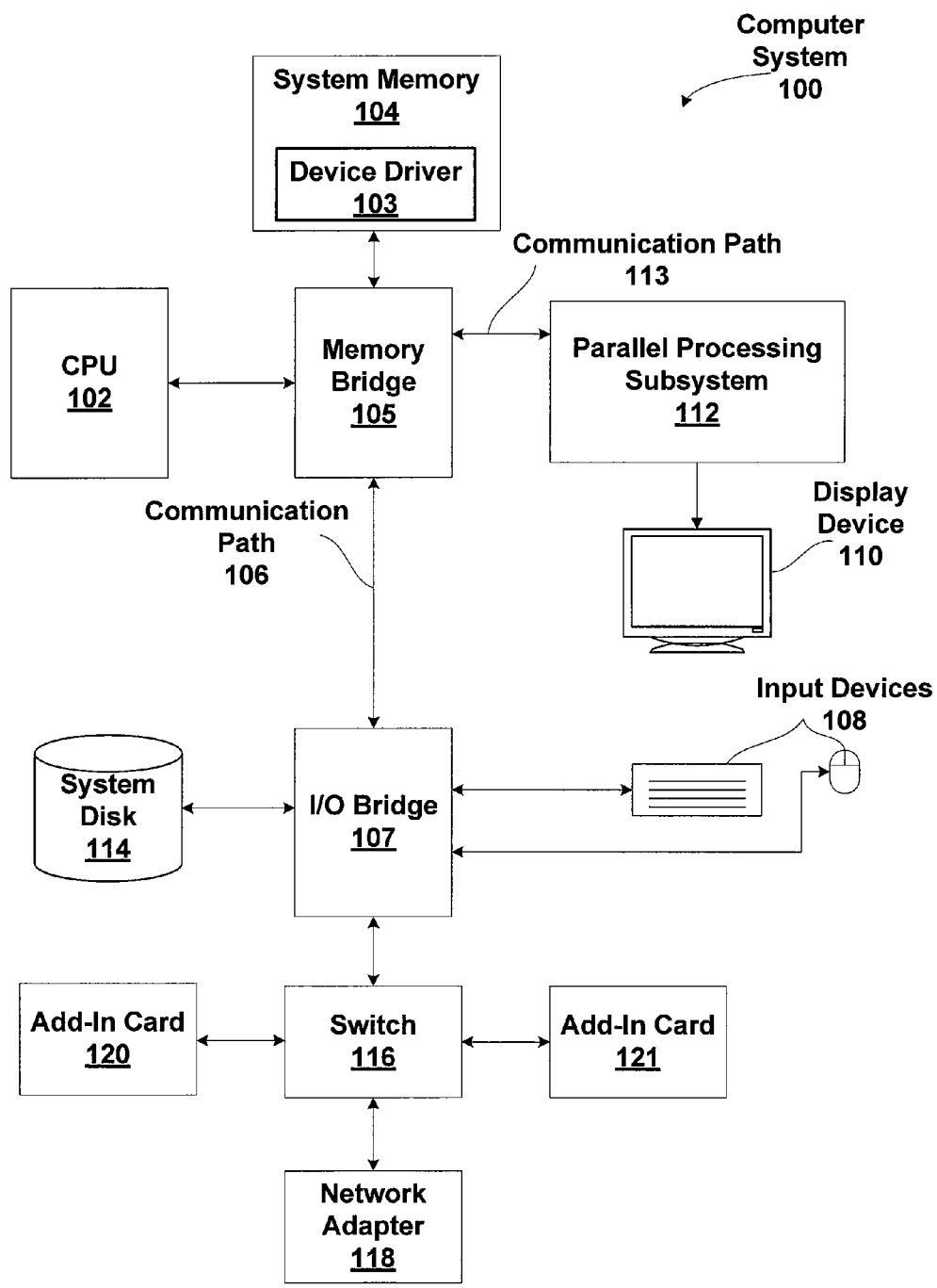
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
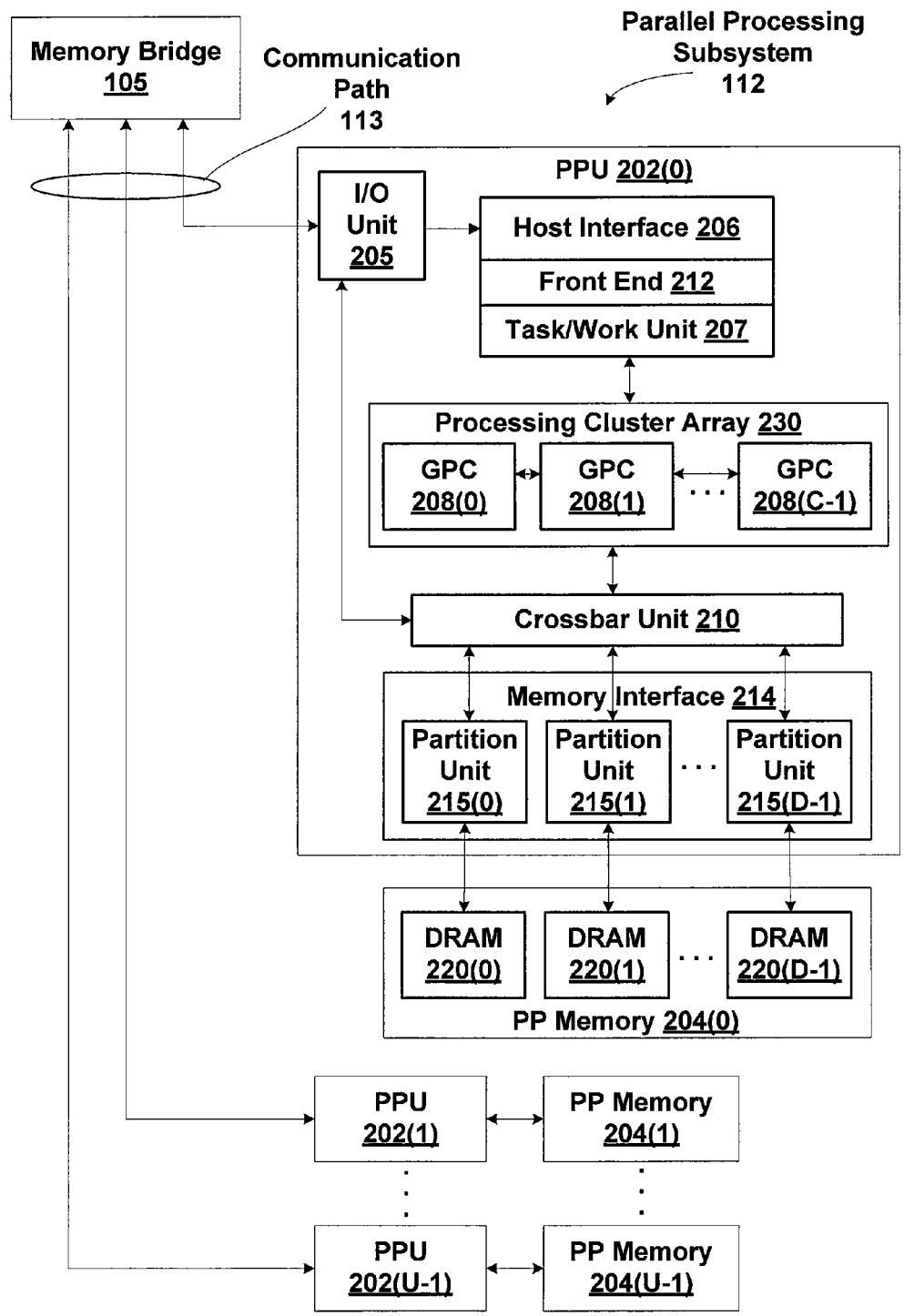
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) (not shown) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
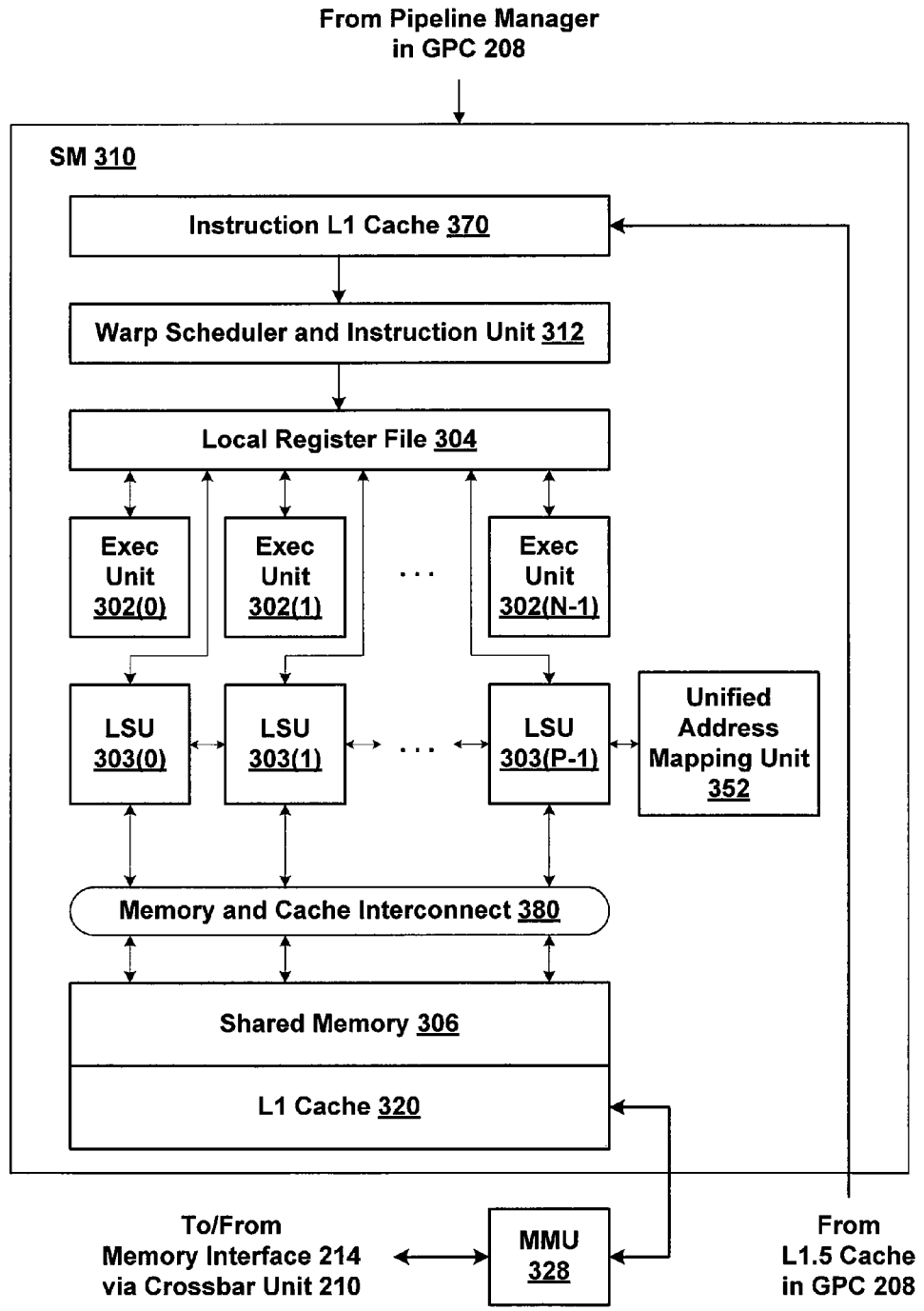
FIG. 3 is a block diagram of a streaming multiprocessor (SM) within a GPC of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Configurable Phase-Based Priority Scheduling

As multiple thread groups are launched by the SM 310 of FIG. 3, the thread groups may launch memory load operations at more or less the same time. As a result, multiple thread groups enter a waiting period while the memory load operations are pending. In addition, the multiple thread groups may access a scarce resource, such as a special-purpose memory buffer, at the same time, where a scarce resource is defined as a resource that can service a relatively small number of threads at a given time. When several thread groups access the same scarce resource, the resource services only some thread groups, according to the capacity of the scare resource. Other thread groups accessing the scarce resource enter a waiting period, pending availability of the resource. As further described below, the thread groups may be skewed, relative to each other, to reduce or eliminate such waiting periods.

FIG. 4 illustrates a thread group 400 that includes multiple phases, according to one embodiment of the present invention. As shown, the thread group 400 includes multiple phases 410, each of which includes an execution cycle 420 followed by a latency period 430.

Each of the multiple phases 410 of the thread group 400 defines a subdivision of the thread group 400 that begins with a group of instructions followed by a period where the thread group 400 waits for a memory load operation to complete. As further described below, each of the different groups of instructions is called an execution cycle 420, and the period where the thread group 400 waits for the memory load operation to complete is called the latency period 430.

In some embodiments, the delineation point between an execution cycle 420 and the following latency period 430 may be defined by a special instruction or flag that indicates one or more memory load instructions are being launched. In one example, phase boundaries could be marked by the compiler, usually after a series of memory or texturing operations. The last memory or texturing operation in the series would be marked using an annotation allowed by the compiler for certain kinds of instructions. For example, a LOAD instruction associated with the last memory or texturing operation in the series could be annotated with a "set phase" marker, such as the suffix "STP." Such a LOAD instruction with a set phase marker would be annotated as "LOAD.STP," to mark the boundary between one phase and the next phase. As further described below, the actual numbering of phases, to identify which threads are executing in which phase, would be performed dynamically as the SM 310 encounters phase boundaries. If a LOAD.STP instruction appears in a branch of a conditional instruction, and the conditional branch is not executed, then the SM 310 would not encounter the LOAD.STP instruction. Accordingly, the SM 310 would not mark a corresponding phase boundary at run time. If a LOAD.STP instruction appears in a loop that is executed ten times, then the SM 310 would encounter the LOAD.STP instruction ten times. Accordingly, the SM 310 would mark ten separate and corresponding phase boundaries at run time from the single LOAD.STP instruction.

Each execution cycle 420 includes instructions that the SM 310 executes. Such instructions may include, without limitation, arithmetic operations, logic operations, and/or memory load operations. During the execution cycle 420, the SM 310 performs various arithmetic and logic operations using local resources, such as registers in the local register file 304 or the L1 cache 320. After performing the arithmetic and logic operations in a given execution cycle 420, the SM 310 accesses one or more memory locations that are not included in the L1 cache 320. For example, the SM 310 could load a texture from memory, where a texture is accessed as a contiguous block of memory locations. Such an access operation is called a memory load operation. When a memory load operation is launched, the SM 310 may execute one or more additional arithmetic and logic operations, so long as the arithmetic and logic operations are not dependent on the results of the memory load operation. At some point, the SM 310 is not able to execute additional instructions until the memory load operation completes. At such a point, the SM 310 begins a latency period 430.

Each latency period 430 represents the period of time where the SM 310 waits for completion of a memory load operation that was launched by the immediately prior execution cycle 420. During the latency period 430, the thread group 400 does not make further forward progress. However, other thread groups could be scheduled for execution during the latency periods 420. As further described below, the SM 310 can be configured to skew different thread groups 400 relative to one other to enable the SM 310 to execute instructions from the execution cycles 420 of one or more other thread groups 400 during the latency periods 430 of a first thread group 400, thereby improving overall processing efficiency.

As shown, the thread group has four phases 410 labeled "Phase 0" through "Phase 3." Phase 0 410(0) includes execution cycle 420(0) followed by latency period 430(0). Likewise, Phase 1 410(1) includes execution cycle 420(1) followed by latency period 430(1), Phase 2 410(2) includes execution cycle 420(2) followed by latency period 430(2), and Phase 3 410(3) includes execution cycle 420(3) followed by latency period 430(3). Note that each execution cycle 420 may include a different number and combination of instructions, such that the various execution cycles 420 have differing durations. Similarly, the duration of each latency period is determined by various factors, including, without limitation, the target location of the memory load operation, the number of memory locations accessed, and/or the speed of the memory that includes those memory locations. As a result, the various latency periods 430 may differ in duration from each other as well.

Initially, various thread groups 400 may all execute in the same phase. In order to improve performance and reduce latency periods, the SM 310 skews thread groups with respect to each other, such that thread groups operate in different phases at any given time. As further described below, the thread groups are assigned an initial low priority that increases over time. At various points in time, the SM 310 selects a thread group that has a high priority and skews the thread group with respect to other thread groups executing in the same phase. The priority of the skewed thread is then reset to a low value. The priority of the skewed thread may then increase again until the thread groups is again selected for skewing at a later time. The priority of a given thread group is determined by a segmented priority descriptor 500, as described in greater detail below.

FIG. 5 illustrates a segmented priority descriptor 500 associated with the thread group 400, according to one embodiment of the present invention. As shown, the segmented priority descriptor 500 includes a texture lock boost 510, a VTG boost 520, a spread priority 530, a phase age 540, and a fair credit value 550.

The texture lock boost 510 is a priority boost that is applied when the thread groups 400 that has acquired a texture lock, but has not able to load the texture via a memory load operation before the texture lock is taken away. Certain memory load operations, such as loading a texture from memory, are performed atomically, where a particular thread group acquires a lock prior to loading the texture. Once a thread group acquires a texture lock, other thread groups are not able to access the same texture until the lock is released. Under certain circumstances, a texture lock may be taken away from a thread group before the thread group is able to complete the texture load. Such thread groups are given a priority boost called the texture lock boost 510. In one embodiment, the texture lock boost 510 may be a single bit. In such a case, the SM 310 may apply a texture lock boost 510 to the thread group 400 by setting the texture lock boost 510 bit to "1" representing a TRUE value. To set the texture lock boost 510, the following algorithm set forth in Table 1 may be used for each partition, where a partition is a group of threads representing a CTA or a tile, as previously described:

TABLE 1

```
texture_unlock = texture lock is being unlocked;
thread_group[i].issued_phase_change = thread_group [i] issued
an instruction that results in a phase change;
// set if texture is unlocked but the thread group still matches the tile &
phase hash
if (texture_unlock && (thread_group [i].hash{tile,phase} ==
       texturelock.hash{tile,phase})) {
           thread_group [i].macroTextureLockBoost = TRUE;
       }
// clear if thread group issues an instruction that caused a phase change
if (thread_group [i].issued_phase_change) {
           warp[i].macroTexLockBoost = FALSE;
       }
```

In this particular algorithm, texture_unlock is a variable that indicates a texture lock has been taken away, and thread_group[i].issued_phase_change is a variable that indicates that thread group 'i' has issued an instruction that results in a phase change. The algorithm sets the texture lock boost 510 for thread group 'i' if the texture lock has been taken away, and the thread group matches a hash code indicating that thread group 'i' previously acquired the lock and is still in the same phase (that is, thread group 'i' has not yet completed the texture load). The algorithm resets the texture lock if thread group 'i' changed phase (that is, thread group 'i' has completed the texture load).

The VTG boost 520 is a priority boost that is applied if the thread group 400 includes a vertex shader, tessellation shader, or geometry shader (collectively, VTG shaders). In a graphics pipeline, VTG shaders appear early in the graphics pipeline, and generate graphics primitives that are processed by a later pipeline stage known as a pixel shader. Typically, pixel shaders are computationally more complex than VTG shaders, and thus take more time to complete a given pixel shading operation. By providing a VTG boost, the VTG shaders can stay ahead of current pixel shader work, helping to ensure the SM 310 has primitives processed by the VTG shaders to dispatch to the pixel shaders. In one embodiment, the VTG lock boost 520 may be a single bit. In such a case, the SM 310 may apply a VTG lock boost 520 to the thread group 400, if the thread group 400 is associated with a VTG shader, by setting the VTG lock boost 520 bit to "1" representing a TRUE value.

The spread priority 530 is used to determine which thread group, among a set of thread groups operating in the same phase, is scheduled for a phase change. When multiple thread groups operate in the same phase, such thread groups may enter the same latency phase at more or less the same time. By skewing the execution of thread groups relative to one another, the thread groups operate in different phases given moments in time. The SM 310 accomplishes this skewing by selecting thread groups for phase change based on the spread priority 530. When the thread group 400 begins execution, the spread priority 530 for the thread group 400 is set to zero. When a second thread group begins execution in the same phase as the first thread group, the spread priority 530 for the second thread group is set to zero, and the spread priority 530 for the first thread group 400 is incremented to one. As each new thread group begins execution, the spread priority 530 for the new thread group is set to one, and the spread priority 530 for all other thread groups operating is incremented. At various intervals, the SM 310 examines all thread groups operating within a particular phase and selects the thread group with the highest spread priority 530. If the thread group 400 has the highest spread priority 530, then the thread group 400 is selected for a phase change. Once the thread group 400 is skewed to operate in the new phase, the spread priority 530 for the thread group 400 resets to zero.

The phase age 540 indicates the amount of time the thread group 400 has executed without a phase change. New thread groups are assigned a phase age of zero as each new thread group begins execution. At various intervals, the SM 310 increments the phase age for all thread groups by one. If the thread group 400 is selected for a phase change, then the phase age 540 for the thread group 400 is reset to zero.

In one embodiment, the SM 310 the phase age 540 for each thread group in a partition may increment by a constant value when a new thread group is launched, when a texture lock occurs, or when a thread group experiences a phase change. When a new thread group is launched, the phase age 540 for the new thread group may be set to zero. The phase age 540 of all other thread groups in the partition may then be incremented by a constant value called the "new thread group boost." When a texture lock occurs, the phase age of the thread group acquiring the lock may be set to zero if the thread group also completes the texture load, as described above. The thread group may then release the texture lock. The phase age 540 of all other thread groups in the partition may then be incremented by a constant value called the "lock acquired boost." When a thread group enters a new phase, the phase age 540 of all other thread groups in the new phase may be incremented by a constant value called the "new phase boost."

In some embodiments, these three constant values may be changed for different modes of priority scheduling. The default values may be as follows:
new thread group boost=1
lock acquired boost=1
new phase boost=2

In other words, the phase age 540 of affected thread groups may increment by one when a new thread group is launched or when a thread group acquires a texture lock. The phase age 540 of affected thread groups may increment by two when a thread group enters a new phase. Various modes may be implemented by varying the value of the three constant values.

In one example, the phase age 540 of affected thread groups could increment by one when a new thread group is launched or when a thread group enters a new phase. The phase age 540 would not increment when a thread group acquires a texture lock. In this mode, priority would be based on phase age 540 of a thread group within a phase, with fair scheduling between phases. The values for three constants would be as follows:
new thread group boost=1
lock acquired boost=0
new phase boost=1

In another example, the phase age 540 of affected thread groups could increment by one when a new thread group is launched. The phase age 540 would not increment when a thread group enters a new phase or when a thread group acquires a texture lock. In this mode, priority would be based on phase age 540 of a thread group, with fair scheduling within a thread group. The values for three constants would be as follows:

new thread group boost=1
lock acquired boost=0
new phase boost=0

In yet another example, the phase age 540 does not increment at all, resulting in a type of round robin fair scheduling. Fair scheduling is described in further detail below. In this mode, the values for three constants would be as follows:

new thread group boost=0
lock acquired boost=0
new phase boost=0

The fair credit value 550 determines when the thread group 400 is selected to advance among a set of thread groups when all other fields of the corresponding segmented priority descriptors 500 are equal. The fair credit value 550 for the thread group 400 is determined via any technically feasible approach, including, without limitation, pseudorandom selection, or round robin techniques. In one embodiment, the fair credit value for each thread group in a partition may be determined via a round robin approach where the fair credit value 550 for a thread group may be set to zero when the thread group is first launched. The fair credit value 550 for a given thread group may increment each time the thread group is scheduled to execute at least one instruction. The fair credit value 550 for each thread group may increment in this fashion until any fair credit value 550 reaches a maximum value. In such a case, the SM 310 may select all thread groups in the same partition that have the same phase age 540 as the thread group with the maximum fair credit value. The fair credit value 550 for all of the selected thread groups may then be reduced by a constant value. The fair credit values 550 may then continue incrementing as described above.

It will be appreciated that the system shown herein is illustrative and that variations and modifications are possible. In one example, the fields of the segmented priority descriptor 500 are arranged such that texture lock boost 510 is the leftmost field and the fair credit value 550. Further, the larger the value in the segmented priority descriptor 500, the higher the priority of the corresponding thread group. Therefore, the texture lock boost 510 is the leftmost field has the most influence on the priority of the thread group, while the fair credit value 550 has the least amount of include on the priority. However, the fields of the segmented priority descriptor 500 could be arranged in any technically feasible order. In another example, separate fields in the segmented priority descriptor 500, such as the spread priority 530 and the phase age 540, could be combined into a single field. In such a case, when the SM 310 increases either the spread priority 530 or the phase age 540, the SM 310 would increment the combined field. The combined single field would represent a value that is based on both spread priority 530 and phase age 540. In yet another example, thread groups could be associated with compute shaders, in contrast with VTG shaders and pixel shaders, where compute shaders perform general computations not categorized as VTG shaders and pixel shaders. As such, compute shaders could be processed using the techniques described herein. In such a case, compute shaders would not receive a VTG boost 520.

FIGS. 6A-6E illustrate a set of thread groups that are skewed to execute in different phases, according to one embodiment of the present invention.

Figure 6A:
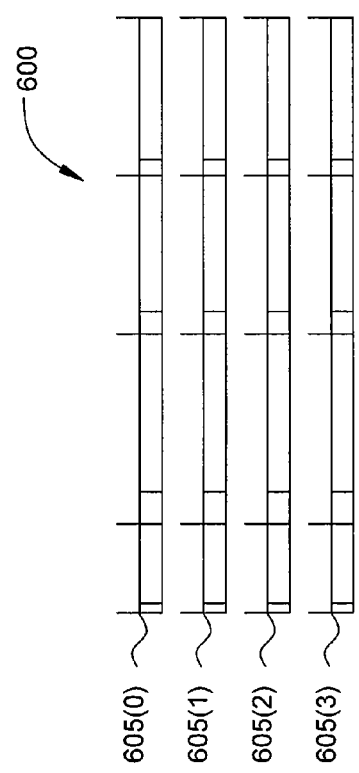
FIGS. 6A-6E illustrate a set of thread groups that are skewed to execute in different phases, according to one embodiment of the present invention.

As shown in FIG. 6A, the set of thread groups 600 is executing concurrently and in the same phase. Thread group 605(0) represents a new thread group that has recently launched. Thread group 605(0), therefore, has an initial priority of zero. Thread group 605(1) launched prior to thread group 605(0) and, therefore, has a higher priority than thread group 605(0). Thread group 605(2) launched prior to thread group 605(1) and, therefore, has a higher priority than either thread group 605(0) or thread group 605(1). Thread group 605(3) launched prior to thread group 605(2) and, therefore, has the highest priority of all four thread groups 605(0)-605(3).

Figure 6B:
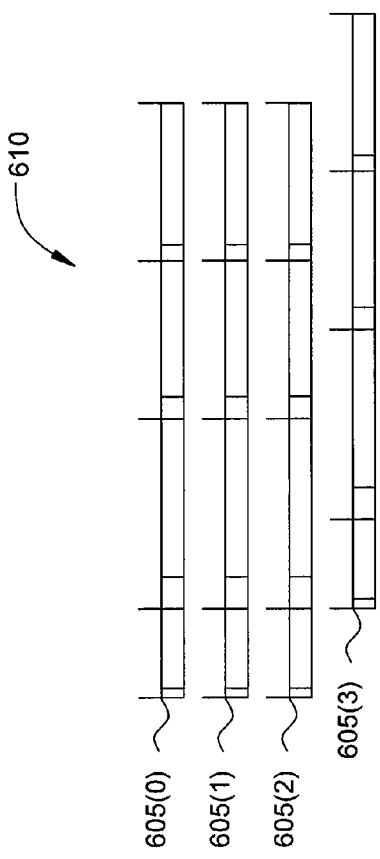

FIG. 6B illustrates the relationship among the thread groups 605(0)-605(3) after thread 605(3) has changed phase. Because thread 605(3) has the highest priority, the SM 310 selects for a phase change. The SM 310 skews thread group 605(3) such that thread group 605(3) executes in a different phase from thread groups 605(0)-605(2). The SM 310 resets the priority of thread group 605(3) to zero and increments the priority of thread groups 605(0)-605(2).

Figure 6C:
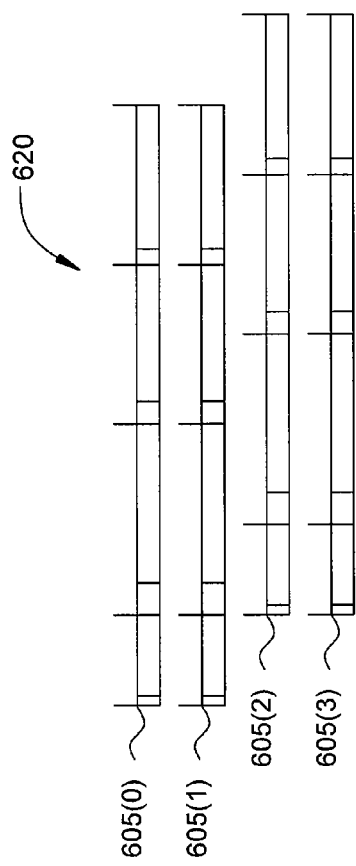

FIG. 6C illustrates the relationship among the thread groups 605(0)-605(3) after thread 605(2) has changed phase. After thread 605(3) changed phase, the thread group with the highest priority is thread group 605(2), the SM 310 selects for a phase change. The SM 310 skews thread group 605(2) such that thread group 605(2) executes in a different phase from thread groups 605(0)-605(1). The SM 310 resets the priority of thread group 605(2) to zero and increments the priority of thread groups 605(0), 605(1), 605(3).

Figure 6D:
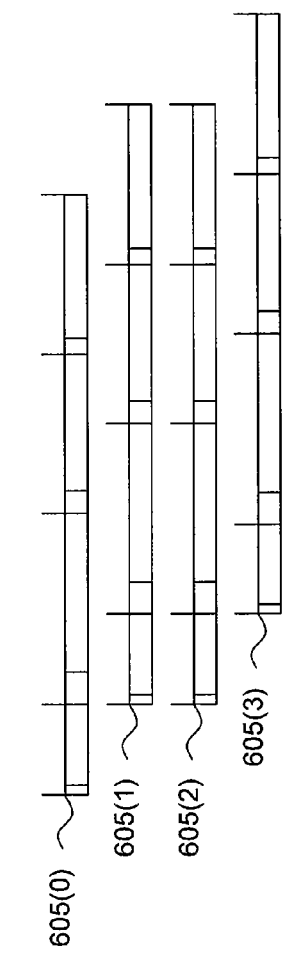

FIG. 6D illustrates the relationship among the thread groups 605(0)-605(3) after thread groups 605(1) and 605(3) changed phase. After thread 605(2) changed phase, thread group 605(1) has higher priority than thread group 605(0), and thread group 605(3) has higher priority than thread group 605(2). Thread groups 605(3) and 605(1) are selected, in turn, to change phase, resulting in the phase relationship as shown in FIG. 6D.

Figure 6E:
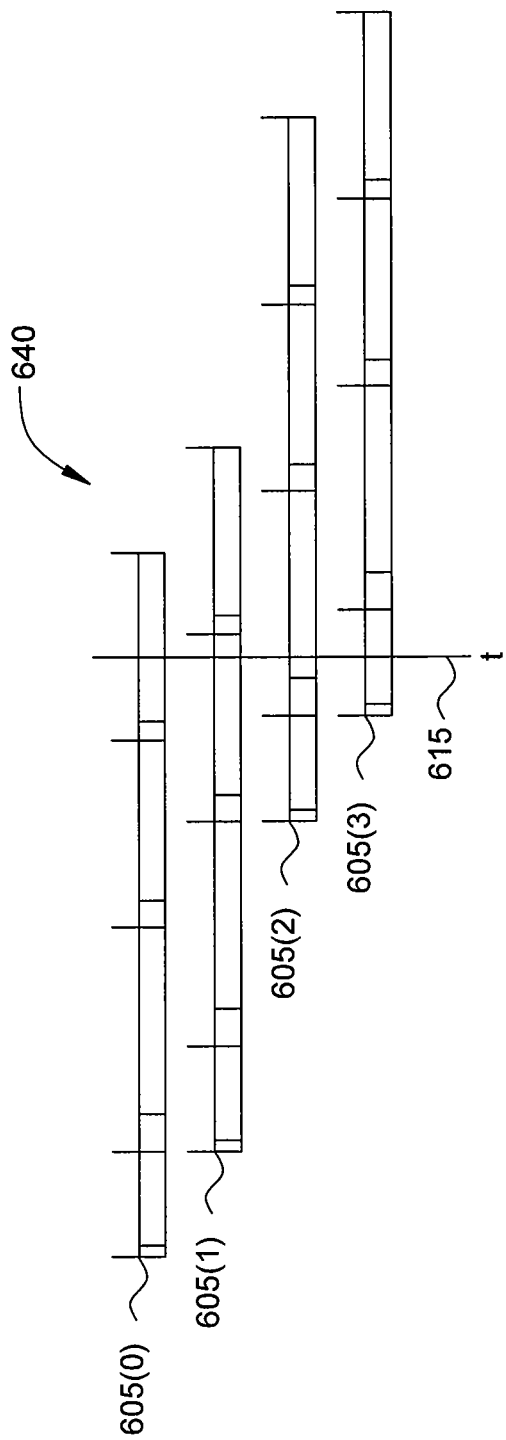

Finally, FIG. 6E illustrates the relationship among the thread groups 605(0)-605(3) after thread groups are skewed to operate in different phases. As execution continues, thread groups 605(0)-605(3) skew step by step until a stable point is reached. At a given time 't' 615, the thread groups are all executing in different phases. Thread groups 605(0)-605(3) execute in Phase 3, Phase 2, Phase 1, and Phase 0, respectively.

Figure 7:
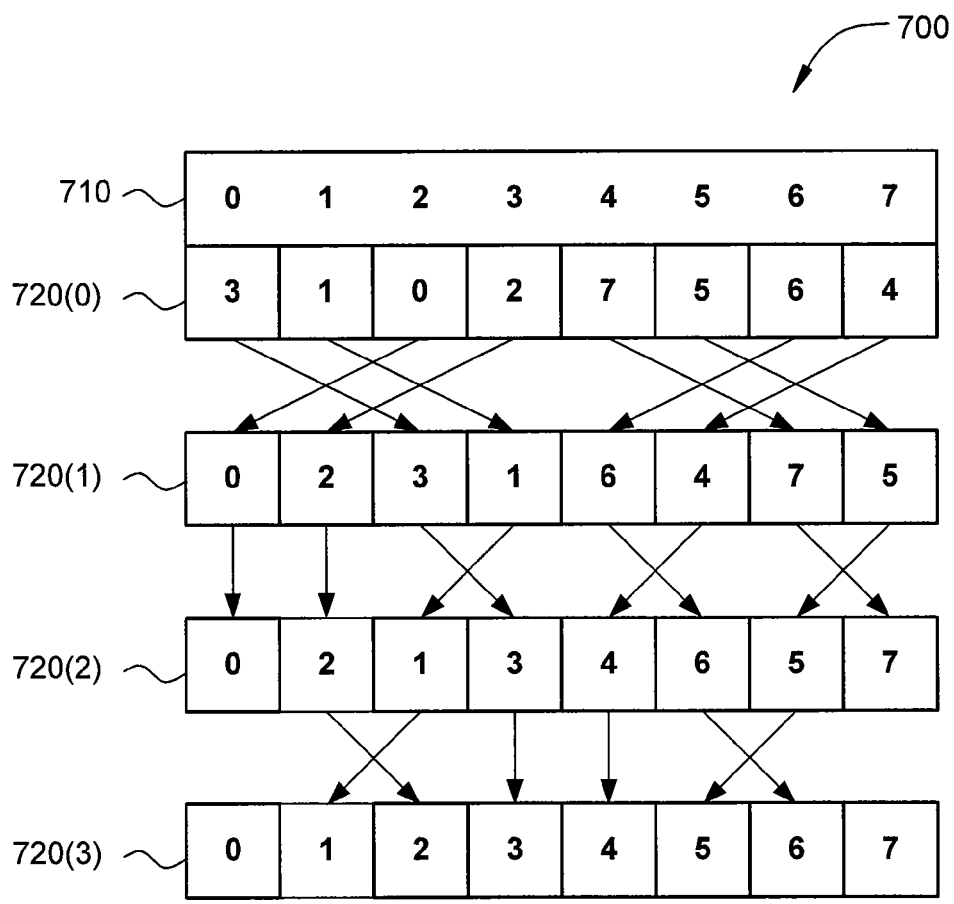
FIG. 7 illustrates a mechanism for sorting priority across multiple thread groups, according to one embodiment of the invention.

FIG. 7 illustrates a mechanism 700 for sorting priority across multiple thread groups, according to one embodiment of the invention. As shown, the mechanism includes four stages 720 that sort the segmented priority descriptors 500 for eight thread groups into priority order.

At the first stage 720(0), the mechanism loads the current segmented priority descriptors 500 into priority cells 710, after the SM 310 applies a phase change to one or more thread groups. For clarity, the rank order of the segmented priority descriptors 500 after such phases changes are shown, and not the actual values of the segmented priority descriptors 500. As described below, priority cells 710 are compared in pairs to determine if the segmented priority descriptors 500 are in correct priority order. Two segmented priority descriptors 500 stored in a pair of priority cells 710 are in correct priority order if the segmented priority descriptor 500 stored in the higher priority cell 710 has a higher value than the segmented priority descriptor 500 stored in the lower priority cell 710. If the two segmented priority descriptors 500 in a pair are in correct priority order with respect to each other, then the two segmented priority descriptors 500 remain in place. If the two segmented priority descriptors 500 in a pair are not in correct priority order with respect to each other, then the two segmented priority descriptors 500 are swapped. As shown, the priority cells 710 from priority 0 (the highest priority) through priority 7 (the lowest priority) contain segmented priority descriptors 500 that have a rank order of 3, 1, 0, 2, 7, 5, 6, 4, respectively.

At the second stage 720(1), the mechanism evaluates each pair of segmented priority descriptors 500 that are two priority cells 710 apart from each other. The mechanism compares priority cell 0 with priority cell 2, determining that two priority cells 710 contain segmented priority descriptors 500 with rank order of 3 and 0 respectively. Because the segmented priority descriptors 500 in the two priority cells 710 are not in priority order, the mechanism 700 swaps the two segmented priority descriptors 500. The mechanism 700 compares, in turn, priority cell 1 with priority cell 3, priority cell 4 with priority cell 6, and priority cell 5 with priority cell 7. Because the segmented priority descriptors 500 in the two priority cells 710 of each pair are not in priority order, the mechanism 700 swaps each pair of segmented priority descriptors 500. After the second stage 720(1), the priority cells 710 from priority 0 (the highest priority) through priority 7 (the lowest priority) contain segmented priority descriptors 500 that have a rank order of 0, 2, 3, 1, 6, 4, 7, 5, respectively.

At the third stage 720(2), the mechanism evaluates each pair of segmented priority descriptors 500 that are in adjacent priority cells 710 starting with priority cell 0. The mechanism compares priority cell 0 with priority cell 1, determining that two priority cells 710 contain segmented priority descriptors 500 with rank order of 0 and 2 respectively. Because the segmented priority descriptors 500 in the two priority cells 710 are in priority order, the mechanism 700 leaves the two segmented priority descriptors 500 in place. The mechanism 700 compares, in turn, priority cell 2 with priority cell 3, priority cell 4 with priority cell 5, and priority cell 6 with priority cell 7. Because the segmented priority descriptors 500 in the two priority cells 710 of each pair are not in priority order, the mechanism 700 swaps each pair of segmented priority descriptors 500. After the third stage 720(2), the priority cells 710 from priority 0 (the highest priority) through priority 7 (the lowest priority) contain segmented priority descriptors 500 that have a rank order of 0, 2, 1, 3, 4, 6, 5, 7, respectively.

At the fourth stage 720(3), the mechanism evaluates each pair of segmented priority descriptors 500 that are in adjacent priority cells 710 starting with priority cell 1. The mechanism compares priority cell 1 with priority cell 2, determining that two priority cells 710 contain segmented priority descriptors 500 with rank order of 2 and 1 respectively. Because the segmented priority descriptors 500 in the two priority cells 710 are not in priority order, the mechanism 700 swaps the two segmented priority descriptors 500. The mechanism 700 compares priority cell 3 with priority cell 4, leaving the corresponding pair of segmented priority descriptors 500 in place. The mechanism 700 compares priority cell 5 with priority cell 6, swapping the corresponding pair of segmented priority descriptors 500. After the fourth stage 720(2), the priority cells 710 from priority 0 (the highest priority) through priority 7 (the lowest priority) contain segmented priority descriptors 500 that have a rank order of 0, 1, 2, 3, 4, 5, 6, 7, respectively.

In some embodiments, the segmented priority descriptors 500 may not be completely sorted after one sort cycle. In such a case, the segmented priority descriptors 500 may partially sort in a given sort cycle. The partially sorted segmented priority descriptors 500 may be used for the next execution cycles, and the following sort cycle may continue to sort the segmented priority descriptors 500. Although the mechanism is shown for sorting eight segmented priority descriptors 500, the mechanism may be applied to any number and size of segmented priority descriptors 500. For example, the mechanism could be configured to sort 32 segmented priority descriptors 500, where each segmented priority descriptor 500 could be a 10-bit value. In another example, the mechanism could include more than four stages 720, where one or more of the stages 720 is repeated in a given sort cycle.

Figure 8A:
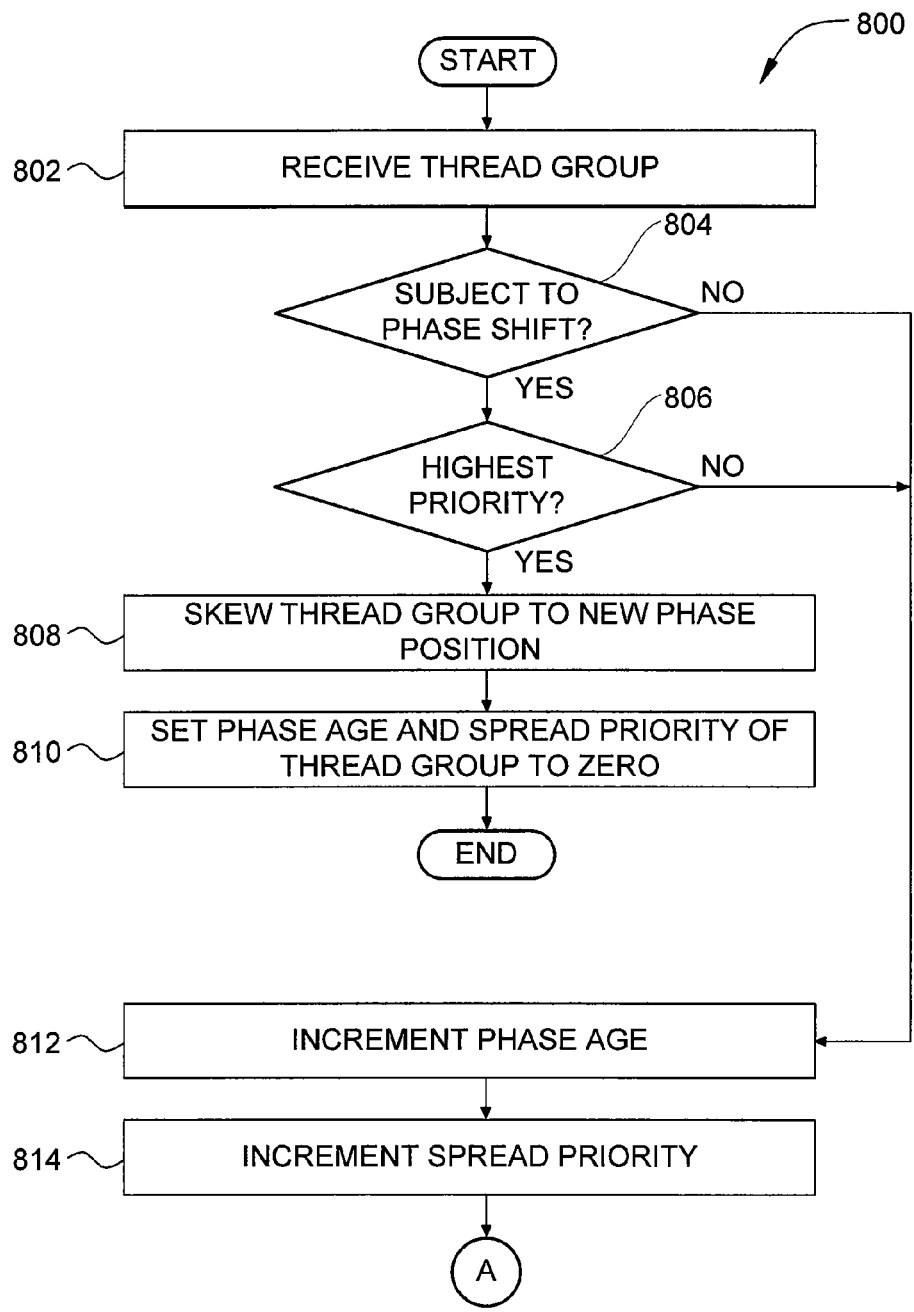
FIGS. 8A-8B set forth a flow diagram of method steps for scheduling thread groups for execution, according to one embodiment of the present invention.
Figure 8B:
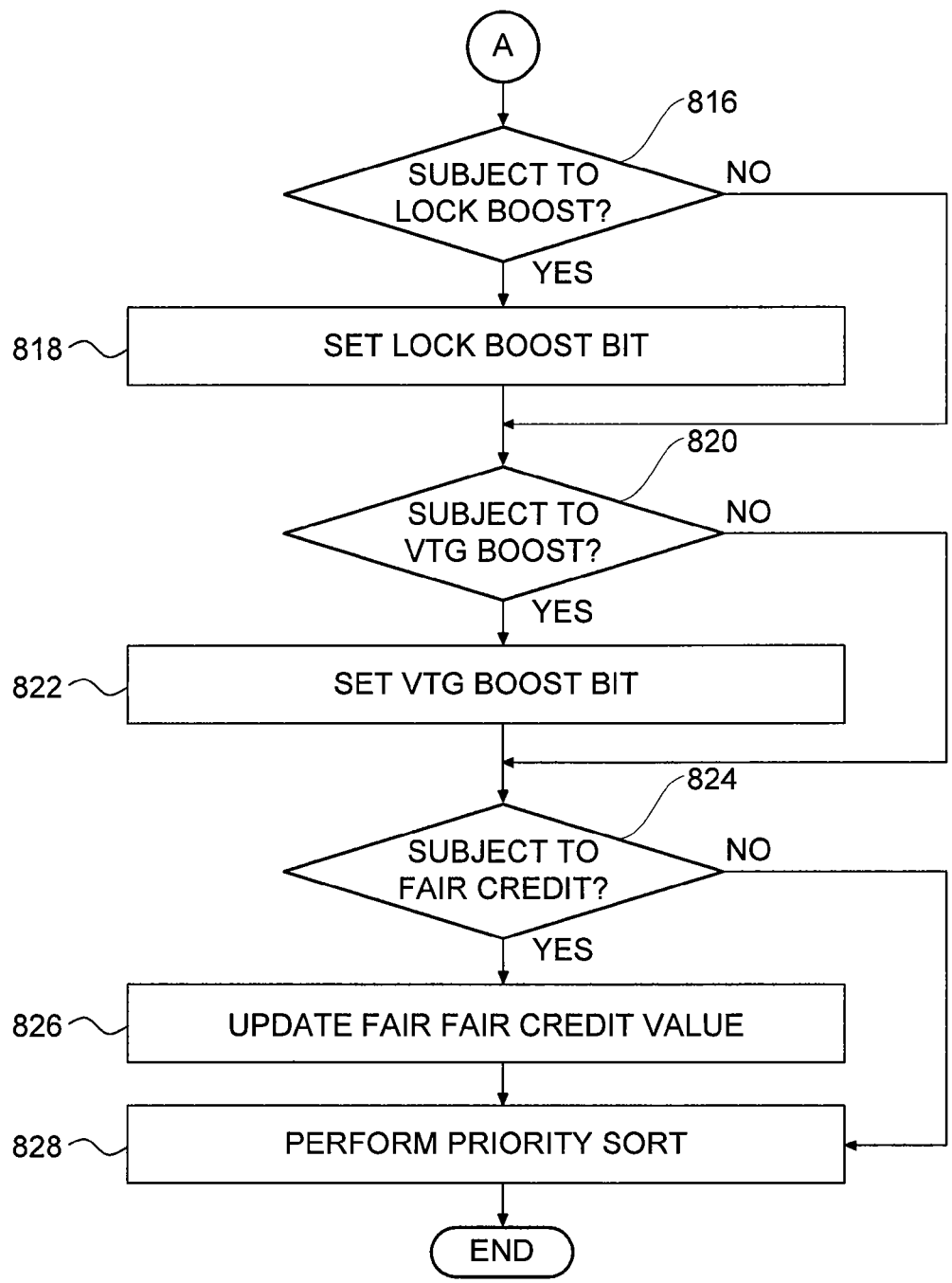

FIGS. 8A-8B set forth a flow diagram of method steps for scheduling thread groups for execution, according to one embodiment of the present invention. Although the method steps are described in conjunction with the systems of FIGS. 1-3, persons of ordinary skill in the art will understand that any system configured to perform the method steps, in any order, is within the scope of the inventions.

As shown, a method 800 begins at step 802, where the SM 310 receives a thread group, such as thread group 400, for the purpose of setting or updating the priority of the thread group. At step 804, the SM 310 determines whether the thread group 400 is subject to a phase shift. For example, the SM 310 could determine whether the thread group is executing in the same phase as at least one other thread group. If the thread group 400 is subject to a phase shift, then the method proceeds to step 806, where the SM 310 determines whether the thread group 400 has the highest priority among the set of thread groups executing in the same phase. If the thread group 400 has the highest priority, then the method 800 proceeds to step 808, where the SM 310 skews the thread group 400 to a new phase position. At step 810, the SM 310 sets the phase age and the spread priority of the thread group 400 to zero. The method 800 then terminates.

Returning to step 806, If the thread group 400 does not have the highest priority, then the method 800 proceeds to step 812, where the SM 310 increments the phase age 540 of the thread group 400. At step 814, the SM 310 increments the spread priority 530 of the thread group 400. At step 816, the SM 310 determines whether the thread group 400 is subject to a lock boost 510. For example, the SM 310 could determine whether the thread group 400 acquired a texture lock, but was not able to load the texture via a memory load operation before the texture lock was taken away. If the thread group 400 is subject to a lock boost 510, then the method proceeds to step 818, where the SM 310 sets the lock boost 510 bit of the thread group 400. At step 820, the SM 310 determines whether the thread group 400 is subject to a VTG boost 520. For example, the SM 310 could determine whether the thread group 400 includes at least one of a vertex shader, tessellation shader, or geometry shader. If the thread group 400 is subject to a VTG boost 520, then the method proceeds to step 822, where the SM 310 sets the VTG boost 510 bit of the thread group 400.

At step 824, the SM 310 determines whether the thread group 400 is subject to a fair credit 550. For example, the SM 310 could determine whether the fields of the segmented priority descriptor 500 for the thread group 400, other than the fair credit 550, are identical with at least one other thread group. If the thread group 400 is subject to a fair credit 550, then the method proceeds to step 826, where the SM 310 updates the fair credit 550 value for the thread group 400. At step 828, the SM 310 performs a priority sort on the set of segmented priority descriptors 500, as described in conjunction with FIG. 7. The method 800 then terminates.

Returning to step 824, if the thread group 400 is not subject to fair credit 550, then the method proceeds to step 828, described above. Returning to step 820, if the thread group 400 is not subject to a VTG boost 520, then the method proceeds to step 824, described above. Returning to step 816, if the thread group 400 is not subject to a lock boost 510, then the method proceeds to step 820, described above. Returning to step 804, if the thread group 400 is not subject to a phase shift, then the method proceeds to step 812, described above.

In sum, threads and thread groups are scheduled for execution by scheduling the latency periods associated with memory load operations. The macro-scheduling unit within the SM determines the overall scheduling priority of thread groups in order that a desired thread group distribution and overall fairness is maintained. Each thread group is subdivided into phases, where each phase is defined by an execution cycle of multiple instructions followed by a memory load operation to retrieve one or more data values from system memory. The priority of each thread group starts at zero and increases for each priority handling cycle where the thread group is not subject to a phase-shift. The thread group with the highest priority, that is, the thread group that has been least-recently phase-shifted, is phase-shifted by one phase, and the priority for the thread group is reset to zero. Priority among the remaining thread groups executing in the same phase is determined using a fairness-based approach, such as round-robin priority. Over time, thread groups spread in time such that thread groups are operating in different phases at any given time. Priority may be "boosted" for certain thread groups to further improve locality of memory load operations, or to provide improved access to shared resource subject to a lock. A priority sort mechanism provides quick re-sorting of thread group priorities after one or more thread groups have a change in priority value.

Advantageously, thread groups execute with increased efficiency, resulting in improved processor performance. Thread groups are scheduled for execution in a manner that reduces the time spent by the processor waiting for completion of memory load operations. In addition, such a phase-spreading approach reduces the likelihood that multiple thread groups simultaneously access certain scare resources, resulting in further performance improvements.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for scheduling priority among a plurality of threads, the method comprising:
receiving a first thread group comprising one or more threads;
retrieving a first priority descriptor associated with the first thread group;
determining whether the first thread group and a second thread group are both operating in a first phase; and
if the first thread group and the second thread are both operating in a first phase, then:
determining whether the first priority descriptor represents a higher priority than a second priority descriptor associated with the second thread group; and
if the first priority descriptor represents a higher priority than the second priority descriptor, then
skewing the first thread group relative to the second thread group such that the first thread group operates in a second phase; or
if the first priority descriptor does not represent a higher priority than the second priority descriptor, then
changing the first priority descriptor from a first value to a second value, wherein the second value represents a higher priority than the first value, or
if the first thread group and the second thread are not both operating in a first phase, then
changing the first priority descriptor from a first value to a second value, wherein the second value represents a higher priority than the first value.

2. The method of claim 1, wherein changing the first priority descriptor from a first value to a second value comprises incrementing a field within the first priority descriptor that represents a phase age associated with the first thread group.

3. The method of claim 1, wherein changing the first priority descriptor from a first value to a second value comprises incrementing a field within the first priority descriptor that represents a spread priority associated with the first thread group.

4. The method of claim 1, wherein skewing the first thread group relative to the second thread group further comprises changing the first priority descriptor from a first value to a third value, wherein the third value represents a lower priority than the first value.

5. The method of claim 1, further comprising:
determining that the first thread group acquired a lock associated with a memory location, wherein the lock was removed prior to a memory load operation associated with the memory location has completed; and
changing the first priority descriptor from a first value to a third value, wherein the third value represents a higher priority than the first value.

6. The method of claim 1, further comprising:
determining that the first thread group is associated with at least one of a vertex shader, a tessellation shader, and a geometry shader; and
changing the first priority descriptor from a first value to a third value, wherein the third value represents a higher priority than the first value.

7. The method of claim 1, further comprising:
determining that at least a first portion of the first priority descriptor is equal to a corresponding portion of a second priority descriptor, and
changing a second portion of the first priority descriptor from a third value to a fourth value.

8. The method of claim 7, further comprising:
determining that the second portion of the first priority descriptor is equal to a threshold value; and
decrementing the second portion of the first priority descriptor.

9. The method of claim 8, further comprising:
determining that the second portion of the first priority descriptor is equal to a corresponding portion of a third priority descriptor; and
decrementing the second portion of the third priority descriptor.

10. The method of claim 1, further comprising:
sorting a set of priority descriptors in priority order, wherein the set of priority descriptors includes the first priority descriptor and the second priority descriptor.

11. The method of claim 1, wherein determining whether the first thread group and the second thread group are both operating in a first phase comprises determining that neither the first thread group nor the second thread group has executed an instruction that includes a marker indicating a boundary of the first phase.

12. A subsystem, comprising:
a streaming multiprocessor configured to schedule priority among a plurality of threads by performing the steps of:
receiving a first thread group comprising one or more threads;

retrieving a first priority descriptor associated with the first thread group;

determining whether the first thread group and a second thread group are both operating in a first phase; and if the first thread group and the second thread are both operating in a first phase, then:

determining whether the first priority descriptor represents a higher priority than a second priority descriptor associated with the second thread group; and if the first priority descriptor represents a higher priority than the second priority descriptor, then skewing the first thread group relative to the second thread group such that the first thread group operates in a second phase; or if the first priority descriptor does not represent a higher priority than the second priority descriptor, then changing the first priority descriptor from a first value to a second value, wherein the second value represents a higher priority than the first value, or if the first thread group and the second thread are not both operating in a first phase, then changing the first priority descriptor from a first value to a second value, wherein the second value represents a higher priority than the first value.

13. The subsystem of claim 12, wherein changing the first priority descriptor from a first value to a second value comprises incrementing a field within the first priority descriptor that represents a phase age associated with the first thread group.

14. The subsystem of claim 12, wherein changing the first priority descriptor from a first value to a second value comprises incrementing a field within the first priority descriptor that represents a spread priority associated with the first thread group.

15. The subsystem of claim 12, wherein skewing the first thread group relative to the second thread group further comprises changing the first priority descriptor from a first value to a third value, wherein the third value represents a lower priority than the first value.

16. The subsystem of claim 12, further comprising:
determining that the first thread group acquired a lock associated with a memory location, wherein the lock was removed prior to a memory load operation associated with the memory location has completed; and
changing the first priority descriptor from a first value to a third value, wherein the third value represents a higher priority than the first value.

17. The subsystem of claim 12, further comprising:
determining that the first thread group is associated with at least one of a vertex shader, a tessellation shader, and a geometry shader; and
changing the first priority descriptor from a first value to a third value, wherein the third value represents a higher priority than the first value.

18. The subsystem of claim 12, further comprising:
determining that at least a first portion of the first priority descriptor is equal to a corresponding portion of a second priority descriptor, and
changing a second portion of the first priority descriptor from a third value to a fourth value.

19. The subsystem of claim 12, further comprising:
determining that the second portion of the first priority descriptor is equal to a threshold value; and
decrementing the second portion of the first priority descriptor.

20. The subsystem of claim 19, further comprising:
determining that the second portion of the first priority descriptor is equal to a corresponding portion of a third priority descriptor; and
decrementing the second portion of the third priority descriptor.

21. A computing device configured to schedule priority among a plurality of threads, comprising:
a streaming multiprocessor;
a memory coupled to the streaming multiprocessor, wherein the memory includes an application program that includes instructions that, when executed by the streaming multiprocessor, cause the streaming multiprocessor to schedule priority among a plurality of threads by performing the steps of:
receiving a first thread group comprising one or more threads;
retrieving a first priority descriptor associated with the first thread group;
determining whether the first thread group and a second thread group are both operating in a first phase; and
if the first thread group and the second thread are both operating in a first phase, then:
determining whether the first priority descriptor represents a higher priority than a second priority descriptor associated with the second thread group; and
if the first priority descriptor represents a higher priority than the second priority descriptor, then
skewing the first thread group relative to the second thread group such that the first thread group operates in a second phase; or
if the first priority descriptor does not represent a higher priority than the second priority descriptor, then
changing the first priority descriptor from a first value to a second value, wherein the second value represents a higher priority than the first value, or
if the first thread group and the second thread are not both operating in a first phase, then
changing the first priority descriptor from a first value to a second value, wherein the second value represents a higher priority than the first value.

* * * * *

UNITED STATES PATENT AND TRADEMARK OFFICE
CERTIFICATE OF CORRECTION

PATENT NO.        : 8,949,841 B2                      Page 1 of 1
APPLICATION NO.   : 13/728828
DATED             : February 3, 2015
INVENTOR(S)       : Jack Hilaire Choquette et al.

It is certified that error appears in the above-identified patent and that said Letters Patent is hereby corrected as shown below:

On the title page, item 57 Abstract, Line 11, please delete "f" and insert --If--

Signed and Sealed this
Seventeenth Day of November, 2015

Michelle K. Lee
*Director of the United States Patent and Trademark Office*